US011130411B2

(12) United States Patent
McRoberts et al.

(10) Patent No.: US 11,130,411 B2
(45) Date of Patent: Sep. 28, 2021

(54) HYBRID POWERTRAIN SYSTEM AND METHOD

(71) Applicant: PEGASUS AERONAUTICS CORPORATION, Waterloo (CA)

(72) Inventors: Matthew McRoberts, Waterloo (CA); Joseph Kinsella, Waterloo (CA); John Biskey, Waterloo (CA); Carl Engelmann, Waterloo (CA)

(73) Assignee: PEGASUS AERONAUTICS CORPORATION, Waterloo (CA)

(*) Notice: Subject to any disclaimer, the term of this patent is extended or adjusted under 35 U.S.C. 154(b) by 0 days.

(21) Appl. No.: 16/946,155

(22) Filed: Jun. 8, 2020

(65) Prior Publication Data

US 2020/0298711 A1 Sep. 24, 2020

Related U.S. Application Data

(63) Continuation of application No. 16/324,268, filed as application No. PCT/IB2017/054886 on Aug. 10, 2017, now Pat. No. 10,696,178.

(Continued)

(51) Int. Cl.

*B60W 20/00* (2016.01)
*H02J 7/14* (2006.01)

(Continued)

(52) U.S. Cl.

CPC .......... *B60L 50/15* (2019.02); *B60L 15/2045* (2013.01); *B60L 50/16* (2019.02); *B60W 20/00* (2013.01); *H02J 7/1492* (2013.01); *B60L 2200/10* (2013.01); *B64D 31/00* (2013.01); *B64D 2027/026* (2013.01); *B64D 2221/00* (2013.01);

(Continued)

(58) Field of Classification Search

CPC ...... B60L 50/15; B60L 50/16; B60L 15/2045; B60L 2200/10; B60W 20/00; B64D 31/00; B64D 2027/026; B64D 2221/00; H02J 7/1492; H02J 7/1438

See application file for complete search history.

(56) References Cited

U.S. PATENT DOCUMENTS 9,174,634 B2 11/2015 Kawai
9,751,625 B2 9/2017 Phan et al.

(Continued)

OTHER PUBLICATIONS

International Search Report, dated Dec. 21, 2017, by ISA/CA, re PCT International Patent Application No. PCT/IB2017/054886.

(Continued)

*Primary Examiner* — Tisha D Lewis

(74) *Attorney, Agent, or Firm* — Perry + Currier Inc.

(57) ABSTRACT

A hybrid powertrain system and method includes a prime mover driving a generator/motor to produce an AC power output. The AC power output is applied to a rectifier which is controlled to transform the applied AC power to DC power to supply a DC Power bus at a selected voltage and current. An energy storage device is also connected to the DC power bus and the current flow between the energy storage device and the DC power bus is monitored and compared to preselected values and the results of that comparison are used to alter the operation of the rectifier to increase or decrease, as needed, the current provided to the DC power bus as electrical loads on the DC power bus change.

4 Claims, 5 Drawing Sheets

Related U.S. Application Data

(60) Provisional application No. 62/372,956, filed on Aug. 10, 2016.

(51) Int. Cl.

| | |
|---|---|
| ***B60L 50/10*** | (2019.01) |
| ***B60L 50/15*** | (2019.01) |
| ***B60L 15/20*** | (2006.01) |
| ***B60L 50/16*** | (2019.01) |
| *B64D 31/00* | (2006.01) |
| *B64D 27/02* | (2006.01) |

(52) U.S. Cl.

CPC ............. *H02J 7/1438* (2013.01); *Y02T 10/70* (2013.01); *Y02T 10/92* (2013.01)

(56) References Cited

U.S. PATENT DOCUMENTS

| | | | | |
|---|---|---|---|---|
| 9,751,626 | B2 | 9/2017 | Phan et al. | |
| 9,764,837 | B2 | 9/2017 | Phan et al. | |
| 9,902,495 | B2 | 2/2018 | Phan et al. | |
| 10,017,266 | B2 | 7/2018 | Phan et al. | |
| 10,351,238 | B2 | 7/2019 | McAdoo | |
| 10,676,191 | B2 | 6/2020 | McAdoo | |
| 2007/0199742 | A1* | 8/2007 | Miyahara | B60K 5/1216 180/58 |
| 2010/0097031 | A1* | 4/2010 | King | B60L 53/22 320/109 |
| 2011/0295456 | A1 | 12/2011 | Yamamoto et al. | |
| 2015/0112533 | A1 | 4/2015 | Kawai | |
| 2015/0136505 | A1 | 5/2015 | Bystedt | |
| 2015/0191250 | A1* | 7/2015 | DeVita | F02C 7/262 701/3 |
| 2015/0336522 | A1 | 11/2015 | Cook et al. | |
| 2017/0107910 | A1* | 4/2017 | Huang | H02M 7/68 |
| 2017/0291712 | A1* | 10/2017 | Himmelmann | B64D 27/10 |
| 2020/0001996 | A1 | 1/2020 | McAdoo | |

OTHER PUBLICATIONS

Written Opinion, dated Dec. 21, 2017, by ISA/CA, re PCT International Patent Application No. PCT/IB2017/054886.

WIPO/IB, International Preliminary Report on Patentability, dated Feb. 21, 2019, re PCT International Patent Application No. PCT/IB2017/054886.

USPTO, Non-Final Rejection, dated Apr. 17, 2020, re U.S. Appl. No. 16/324,268.

USPTO, Notice of Allowance and Fee(s) Due, dated May 19, 2020, re U.S. Appl. No. 16/324,268.

* cited by examiner

HYBRID POWERTRAIN SYSTEM AND METHOD

RELATED APPLICATIONS

This application claims priority from U.S. provisional patent application, entitled, "Systems And Methods For Hybrid Power Distribution Using Battery Measurement Current Control", Ser. No. 62/372,956, filed Aug. 10, 2016, the contents of which are incorporated herein by reference.

FIELD OF THE INVENTION

The present invention relates to a powertrain system and a method of operating the same. More specifically, the present invention relates to a hybrid powertrain system including a prime mover and an electrical generator to power a variable load.

BACKGROUND OF THE INVENTION

In many applications, the use of electric motors represents a simple and effective method for delivering mechanical power for traction and/or propulsion systems. This is especially the case for devices such as small-scale single-rotor and multi-rotor unmanned aerial vehicles ("UAVs").

A variety of energy storage methods have been used to provide the power necessary for electric motor driven traction and propulsion applications and examples include, but are not limited to: petrol-electric or diesel-electric powertrains; turbine-electric powertrains; and batteries.

In petrol-electric and diesel-electric powertrains, a prime mover combusts petroleum based fuel (typically liquid) to create mechanical energy and that mechanical energy is then converted to electricity by a generator driven by the mechanical energy. Such systems are commonplace in marine, freight, and industrial applications and are commonly used in applications where the electrical load is relatively constant, and the load response of the generator set has little effect on the proper operation of the vehicle.

Turbine-electric powertrains represent a similar method of operation as petrol-electric and diesel-electric powertrains, but implement a gas turbine as the prime mover.

In other applications, such as electric UAV applications, batteries are most commonly employed due to their ease of use and, with certain battery chemistries with high discharge capabilities, their ability to supply large amounts of power and rapidly meet a variable power demand. Systems such as UAVs can have rapidly changing electrical load requirements which the powertrain must be able to accommodate for proper operation and this is especially true for UAVs, where the vehicle is inherently unstable and relies on the rapid response of the powertrain to stay airborne and stable and batteries have been the preferred power system solution.

Despite these advantages, several problems exist with the use of batteries as the energy source in a powertrain system. For example, batteries are typically manufactured with specific chemistries that are a compromise between energy density, capacity, expected lifetime (rechargability and robustness), weight, safety (flammability, chemical reactivity), expense, expected operating temperature range, etc.

In particular, even the best currently available batteries offer a very low gravimetric energy density relative to most combustion fuels. Using UAV platforms as an example, the low gravimetric energy density of even the best (and often most expensive) batteries unduly limit payload capacities and flight times, making UAVs unusable in applications for which they would otherwise be well suited. Similar problems exist with the use of batteries in the automotive field, for example the range of Tesla™ battery powered vehicles is generally much less than comparable vehicles powered by combustion engines.

Prior attempts to address the limitations of battery powered powertrains have included hybrid powertrain systems which employ a combination of batteries and combustion fuel energy sources. In hybrid powertrain systems, a battery is combined with an electric generator and combustion engine. There are a variety of operating strategies for such hybrid powertrain systems, but to some extent, all of these strategies involve operating the combustion engine to produce an electric power output that can then be applied to electric drive motors in combination with the output of the battery, or to directly recharge the battery.

Because these powertrains use the generator as a complement to the battery system, the batteries in these systems are recharged and discharged frequently and are often responsible for meeting all (or most) of the vehicle's power demands for a significant period of time. This necessitates a battery with a very large capacity and with a battery chemistry that makes them unsuitable for applications where weight and cost is a significant concern.

SUMMARY OF THE INVENTION

It is an object of the present invention to provide a novel hybrid powertrain system and method of operating same which obviates or mitigates at least one disadvantage of the prior art.

According to a first aspect of the present invention, there is provided a hybrid powertrain system comprising: an energy storage device; a prime mover operable to combust a fuel and produce a rotational output; an engine controller controlling the operating parameters of the prime mover, including at least its operating speed; a generator/motor operable, in a first state, to produce an electrical alternating current when rotated by the rotational out of the prime mover and operable, in a second state, to produce a rotational output to rotate the prime mover when provided with an electrical alternating current input; a rectifier operable in a first state to convert the electrical alternating current produced by the generator/motor into a direct current at a selected voltage and to provide that direct current to a power bus to the energy storage device is connected and operable in a second state to invert direct current energy provided from the energy storage device into an alternating current which can be provided to the generator/motor; and a generator control unit operable to select the state of the rectifier and to select the voltage of the direct current provided to the power bus.

Preferably, the energy storage device is a battery and the prime mover is an internal combustion engine.

According to another aspect of the present invention, there is also provided a method of operating a hybrid powertrain including a prime mover which combusts a fuel, and engine control unit operable to control the prime mover, a generator/motor connected to the prime mover, a rectifier electrically connected between the generator/motor and a direct current power bus, a generator control unit operable to control the rectifier and an energy storage device connected to the direct current power bus, comprising the steps of: (i) receiving a signal to start the powertrain; (ii) the generator control unit configuring the rectifier to invert direct current power supplied to the power bus by the energy storage device into alternating current power; (iii) providing the alternating current power to the generator/motor to rotate the prime mover; (iv) the engine control unit starting the prime mover and the prime mover operating the generator/motor; (v) the generator control unit configuring the rectifier to rectify the alternating current, produced by the rotation of the generator/motor, to a direct current at a selected voltage and providing that direct current to the direct current power bus; and (vi) the generator control unit monitoring the current flow between the energy storage device and direct current power bus and adjusting the operation of the rectifier to alter the voltage of the rectified direct current provided to the direct current power bus such that the monitored current flow is substantially equal to a preselected value.

The present invention provides a hybrid powertrain system and method which includes a prime mover driving a generator/motor to produce an AC power output. The AC power output is applied to a rectifier which is controlled to transform the applied AC power to DC power to a DC Power bus at a selected voltage and current. An energy storage device is also connected to the DC power bus and the current flow between the energy storage device and the DC power bus is monitored and compared to preselected values and the results of that comparison are used to alter the operation of the rectifier to increase or decrease, as needed, the current provided to the DC power bus as electrical loads on the DC power bus change.

BRIEF DESCRIPTION OF THE DRAWINGS

Preferred embodiments of the present invention will now be described, by way of example only, with reference to the attached Figures, wherein.

DETAILED DESCRIPTION OF THE INVENTION

Figure 1:
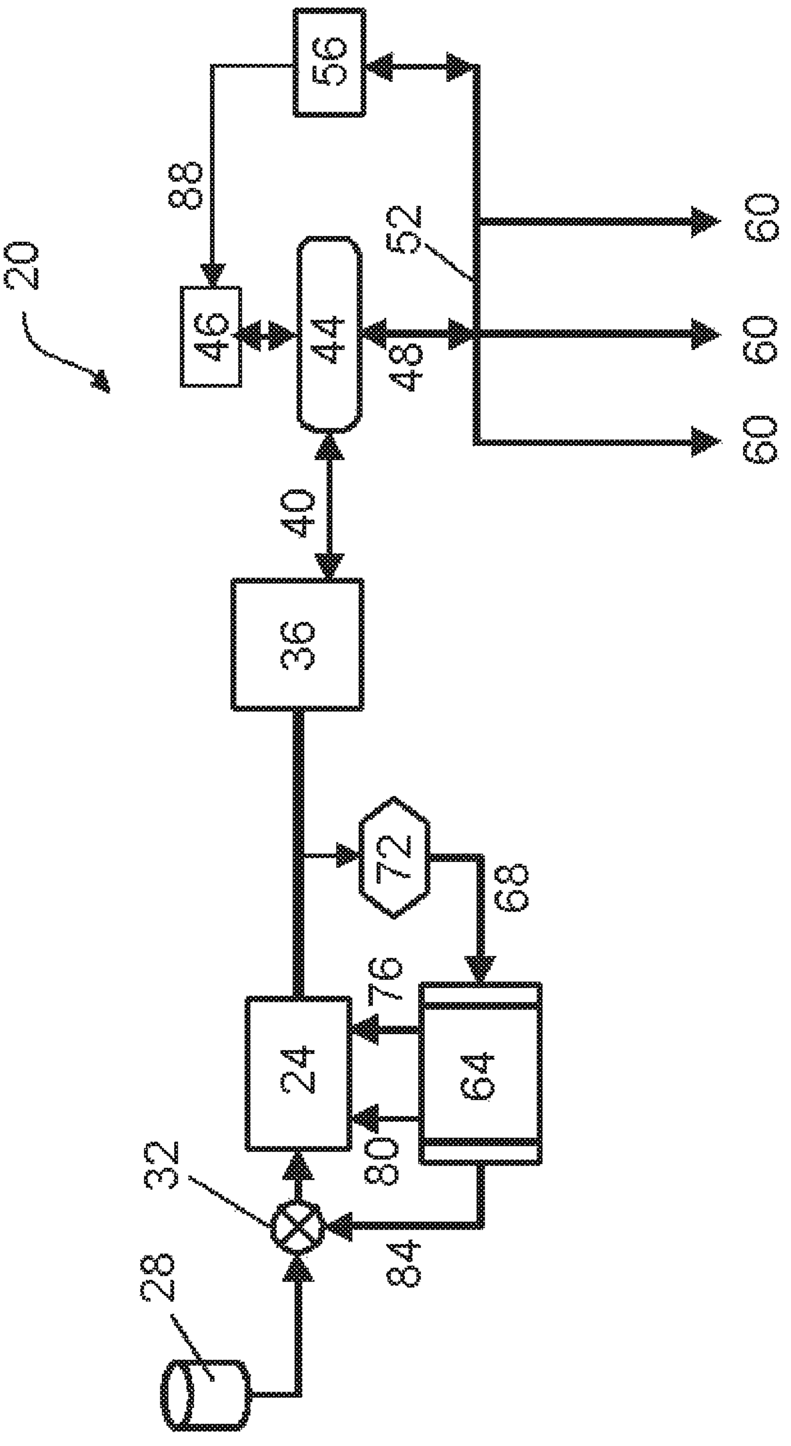
FIG. 1 is a schematic representation of a powertrain in accordance with the present invention.

It will be appreciated that for simplicity and clarity of illustration, in some cases, reference numerals may be repeated among the attached Figures to indicate corresponding or analogous elements. In addition, some details or features are set forth to provide a thorough understanding of the embodiments described herein. However, it will be understood by those of ordinary skill in the art that the embodiments described herein are illustrative examples that may be practiced without these details or features. In other instances, well-known methods, procedures and components have not been described in detail so as not to obscure the disclosure illustrated in the examples described herein. Also, the description is not to be considered as limiting the scope of the example embodiments described herein or illustrated in the drawings.

Electric powertrains are commonly used in vehicles such that the mechanical complexity, cost, and weight of gearboxes and/or differentials can be avoided. In many industrial applications that implement electric powertrains, energy is provided by a diesel-electric or petrol-electric power unit. The method by which these powertrains are used for these applications typically negates the need for battery storage systems, but such electric powertrain systems are incapable of accommodating rapidly changing loads as a result.

Battery storage methods are also commonly employed with electric powertrains for traction or propulsion applications. Due to the inherent discharge properties of batteries, they are capable of outputting sufficient power to satisfy the demands of a rapidly varying load. Consequently, in applications where coping with a rapidly varying load is necessary, such as road vehicles or UAVs, batteries are desirable.

However, the amount of energy that can be stored in batteries is significantly less than what can be stored in the same mass of many combustible fuels, such as petroleum based fuels. Thus, hybrid powertrain systems have been developed which include a generator driven by a prime mover, powered by a combustible fuel, in addition to batteries and this allows for the batteries to be recharged if their state of charge is below a specified threshold, extending the range and endurance of the vehicle. This commonly implemented architecture requires large onboard batteries so that the generator need only be used in certain circumstances. For some applications, such as in UAVs or ground vehicles, it is herein recognized that the total weight of the large onboard batteries, combustible fuel source, prime mover and generator set can significantly impact the usability of such systems.

As described in more detail below, the invention described herein is a hybrid powertrain and control method therefor, whereby the required size of the onboard battery is reduced relative to prior art systems, reducing the overall weight and production cost of the system while still providing the advantages of an electric powertrain. In one aspect, the system described herein is intended to reduce the high discharge use of the battery, improving the life of the powertrain.

A hybrid powertrain system, in accordance with an embodiment of the present invention, is indicated generally at 20 in FIG. 1. Powertrain 20 includes a prime mover 24, which can be any suitable combustion-powered prime mover as would occur to those of skill in the art. A fuel supply reservoir 28 is included to supply prime mover 24 with necessary fuel to operate and a mixture control 32 to provide a desired fuel/air mixture to prime mover 24 for combustion.

In one current embodiment of powertrain 20, prime mover 24 is a gasoline/oil fuel-injected, two stroke, single cylinder water cooled engine having a displacement of thirty five cubic centimeters. In another current embodiment of powertrain 20, prime mover prime mover 24 is a gasoline/oil fuel-injected, two stroke, two cylinder water cooled engine having a displacement of seventy cubic centimeters. The selection of the number of cylinders, total displacement and fuel type for prime mover 24 is not particularly limited and is largely dependent upon the desired power output of powertrain 20 and is within the normal skill of those of skill in the art.

Further, the present invention is not limited to the use of two stroke engines or gasoline fuel, and the use of four stroke engines, gas turbines, rotary engines and a variety of other known prime mover technologies are all contemplated as being within the scope and ambit of the present invention.

In powertrain 20, the output torque of prime mover 24 is applied to an electric generator/motor 36 which produces an AC output current 40. As described in more detail below, in a current embodiment generator/motor 36 is comprises at least one three phase brushless DC ("BLDC") motor which, when operating as a generator, outputs AC output current 40. AC current 40 is applied to rectifier 44 which converts the AC electrical output to a DC output current 48 which is applied to a DC power bus 52.

In a first embodiment, rectifier 44 is an active MOSFET Bridge rectifier which can rapidly vary DC output current 48 independent of the rotational speed of prime mover 24 and generator/motor 36. In particular, as is known to those of skill in the art, active rectification improves the efficiency of a passive rectifier by replacing diodes with actively controlled switches. Non-limiting examples of these switches include transistors such as MOSFETs or IGBTs and these switches are controlled continuously by pulse width modulation (PWM) signals to their gates in order to achieve rectification. By modulating these pulse width gate signals, the output of rectifier 44 can be controlled independently of the operating rotational speed of generator/motor 36.

Rectifier 44 is controlled by a generator control unit (GCU) 46 which comprises a microcontroller, executing an appropriate control program, and appropriate electrical interface circuitry. The PWM signal, produced by GCU 46 in rectifier 44, cycles between two digital states: "high" and "low" and six PWM signals are required for a 3 phase active rectifier circuit, one for each of the switches. When any of the PWM signals is in a "high" state, the corresponding switch is placed into a closed state and allows current to flow through itself. When the same signal is "low" the corresponding switch opens and prevents current from flow through itself.

Non-limiting examples of active rectification methods include a method commonly referred to as regenerative braking. As is well understood by those of skill in the art, in regenerative braking systems a 3-phase motor such as, but not limited to, a BLDC motor is driven mechanically, by a prime mover or by other means, and as the motor rotates an AC back EMF voltage is produced in the coil windings of the motor. A 3-phase bridge of active switches is required to rectify the output EMF voltage and by modulating the signal to these switches, a boost converter process is employed to output to a desired DC voltage and current even when the back EMF AC voltage of the motor is lower than that desired to be provided as the DC output.

By controlling the duty cycle of the PWM signals to the switches in rectifier 44, GCU 46 can control rectifier 44 such that motor/generator 36 can output current to DC power bus 52 when the back EMF of generator/motor 36 is otherwise at a lower voltage than DC power bus 52.

It should be noted that the current within the phases of generator/motor 36 is continuous across the entire PWM cycle, while the current is only output to DC power bus 52 during the second state. This causes the average current in generator/motor 36 to be higher than the current output to DC power bus 52.

The ratio of the average current in generator/motor 36 compared to the average current output to DC power bus 52 is equal to the inverse of the ratio of the voltage of the motor compared to the voltage of the DC bus. This is different from a typical prior art passive bridge rectification circuit, where the voltage produced by the back EMF of the generator would cause current flow through a diode rectifier as it is converted into DC. This would require the voltage applied by the back EMF in the coils of the generator to be larger in magnitude than any other voltage applied to the DC output, particularly a voltage supplied by a battery connected to the output. In order for the back EMF to be high enough in magnitude to cause current to flow through the passive bridge rectifier, the generator would have to be rotated at the speed required to generate that corresponding voltage. This would constrain the operational speed of the engine to substantially a single speed.

In contrast, with the present invention the rotational speed of prime mover 24 is not constrained/limited by a need to create a particular output voltage at generator/motor 36 and thus prime mover 24 can be operated at, or near, its most efficient operating point. As is well known, combustion engines typically have an optimal set of operating speeds and conditions and with the present invention prime mover 24 can be operated at, or near, such speeds and conditions. Therefore prime mover 24, and thus powertrain 20, can be operated in a fuel (and/or emissions) efficient manner independent of the required output voltage.

In another preferred embodiment, rectifier 44 comprises an inverter, such as a BLDC motor controller, which can accept a DC power input and produce the necessary AC power to operate a BLDC, a passive diode bridge rectifier, GCU 46 and a DC-DC converter which is operable to rapidly vary DC output current 48 independent of the rotational speed of the prime mover 24 and generator/motor 36. As is known, a conventional passive rectifier is constrained to outputting a specific voltage which is related to the input voltage applied to it. In the case of powertrain 20, the input voltage to rectifier 44 is directly related to the rotational speed of generator/motor 36. However, the DC-DC converter or rectifier 44 accepts the output voltage from the passive rectifier and is operable to convert it to any other DC current required by the system.

As is known to those of skill in the art, active rectification requires sophisticated control electronics in order to control a BLDC motor and in this embodiment the need for such electronics is avoided by using the inverter included in rectifier 44 in this embodiment. This inverter is employed to operate generator/motor 36 as a motor to start, or restart, prime mover 24.

In this embodiment, the DC-DC converter can be controlled with a PWM signal with a duty cycle correlating with the ratio of step up or step down voltage ratio. Passive rectification followed by DC-DC conversion can control the output voltage without controlling the BLDC motor. By GCU 46 modulating the PWM signal to the DC-DC converter, the output of rectifier 44 can be controlled independently of the operating rotational speed of generator/motor 36.

In both embodiments, it is contemplated that engine controller 64 can operate prime mover 24 at a speed selected from a predefined table of loads and corresponding optimal speeds and/or that engine controller 64 can operate to dynamically control the speed of prime mover 24 corresponding to input parameters, such as fuel consumption, operating temperature, throttle position, etc. which it processes to determine a desired appropriate operating speed. Suitable algorithms and/or techniques for such input parameter driven engine control systems are well know to those of skill in the art and need not be described further herein.

A DC energy storage device 56 is also connected to DC power bus 52 and can be charged from DC power bus 52, or can supply stored power to DC power bus 52, as desired. In a current embodiment, DC storage device 56 is a lithium polymer battery, but rechargeable batteries employing other battery chemistries, or other energy storage devices such as super capacitors, can be employed alternatively as desired. A variety of electrical loads 60 can be connected to DC power bus 52, as desired, to be appropriately powered therefrom. Such loads can include the rotors of UAVs, sensor platforms mounted to such UAVs, etc.

Both prime mover 24 and rectifier 44 must be responsive to the load applied to DC power bus 52. Accordingly, an engine controller 64 is provided for prime mover 24. Engine controller 64 includes a microcontroller (which can be the microcontroller in GCU 46, or which can be a separate microcontroller) which executes a control program responsive to a signal 68 from a shaft rotational speed sensor 72. When controlling a gasoline engine, engine controller 64 provides, in accordance with the control program, a throttle position control signal 76 and an ignition timing signal 80 to prime mover 24, along with a fuel/air mixture control signal 84 which is provided to mixture control 32. In a current embodiment, prime mover 24 is fuel injected, and thus throttle control signal 76 is applied to control the engine throttle and engine controller 64 controls operation of the fuel injection system to provide a desired appropriate fuel/air mixture.

As will be apparent to those of skill in the art that, if prime mover 24 is a diesel engine, or a gas turbine, etc. engine controller 64 can provide the appropriate equivalent, or corresponding, control signals to prime mover 24 in accordance with the control strategies, described in more detail below.

In addition to engine controller 64 operating to accommodate varying loads applied to DC power bus 52, GCU 46 is also responsive to a signal 88 which indicates the amount and direction of electrical current moving between DC energy storage device 56 and DC power bus 52.

Figure 2:
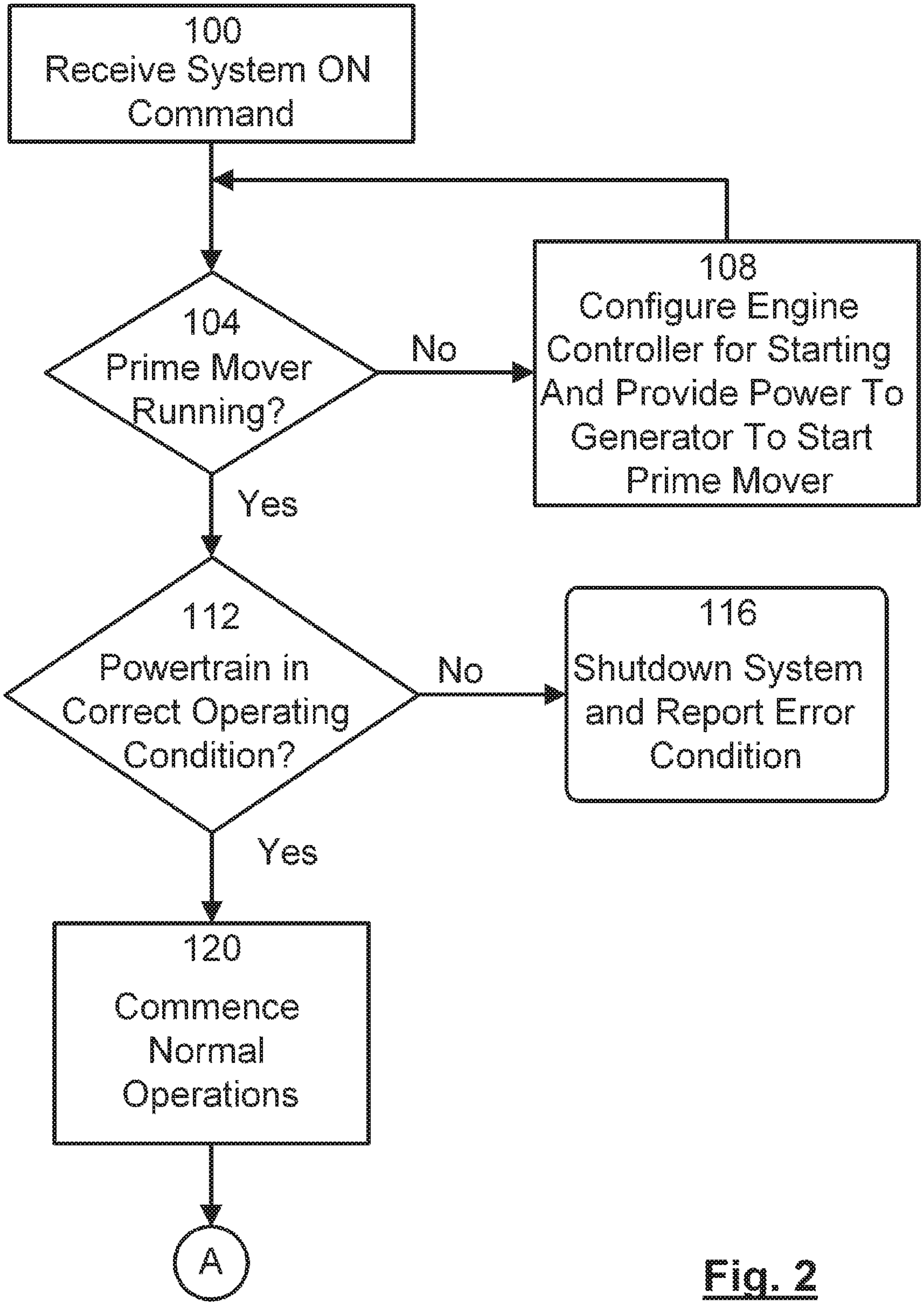
FIG. 2 is a flowchart showing a method of starting the powertrain of FIG. 1.

Operation of powertrain 20 will now be described, with reference to the flowcharts of FIGS. 2 and 3. In FIG. 2 the method of starting powertrain 20 is shown. At step 100, a command is received at powertrain 20 to activate the system. At step 104, engine controller 64 determines if prime mover 24 is operating. If engine controller 64 determines that prime mover 24 is not operating, the process proceeds to step 108 where if rectifier 44 is an active rectifier GCU 46 sets rectifier 44 into a motor operating configuration to provide energy from energy storage device 56, via DC power bus 52 which, as rectifier 44 is in motor operating configuration, it converts to AC energy, to generator/motor 36. If rectifier 44 is a passive rectifier, DC-DC converter and an inverter, then GCU 46 operates the inverter to rotate generator/motor 36.

Generator/motor 36 commences operation as a motor and effectively operates as a starter motor to rotate prime mover 24. At the same time, engine controller 64 produces the necessary throttle signal 76, ignition timing signal 80 and mixture signal 84 to start prime mover 24. Steps 104 and 108 are repeated until it is determined, at step 104, that prime mover 24 is running.

While detailed discussion of various possible error conditions is omitted from this discussion for clarity, it will be understood by those of skill in the art that various error-checking and/or error handling routines can, and in most cases will, be implemented for safety and user convenience. For example, if steps 104 and 108 are performed more than a predetermined number of times within a specified time period, powertrain 20 can abort its attempted start of prime mover 24 and report an error condition, in an appropriate manner, to its user.

If it is determined at step 104 that prime mover 24 is running, the method continues at step 112 wherein powertrain 20 performs a self check to ensure that all monitored parameters (rotational speed of prime mover 24, operating temperature of prime mover 24, output current from generator/motor 36, voltage level on DC power bus 52, voltage of energy storage device 56, etc.) are within pre-specified acceptable limits. If one or more monitored parameters are out of the pre-specified acceptable limits, at step 116 powertrain 20 is shut down and an appropriate error condition is reported.

If, at step 112, it is determined that all monitored parameters are within acceptable limits, the process continues at step 120 wherein normal operations commence, with powertrain 20 providing DC power to loads 60 and/or charging energy storage device 56 if necessary.

Figure 3:
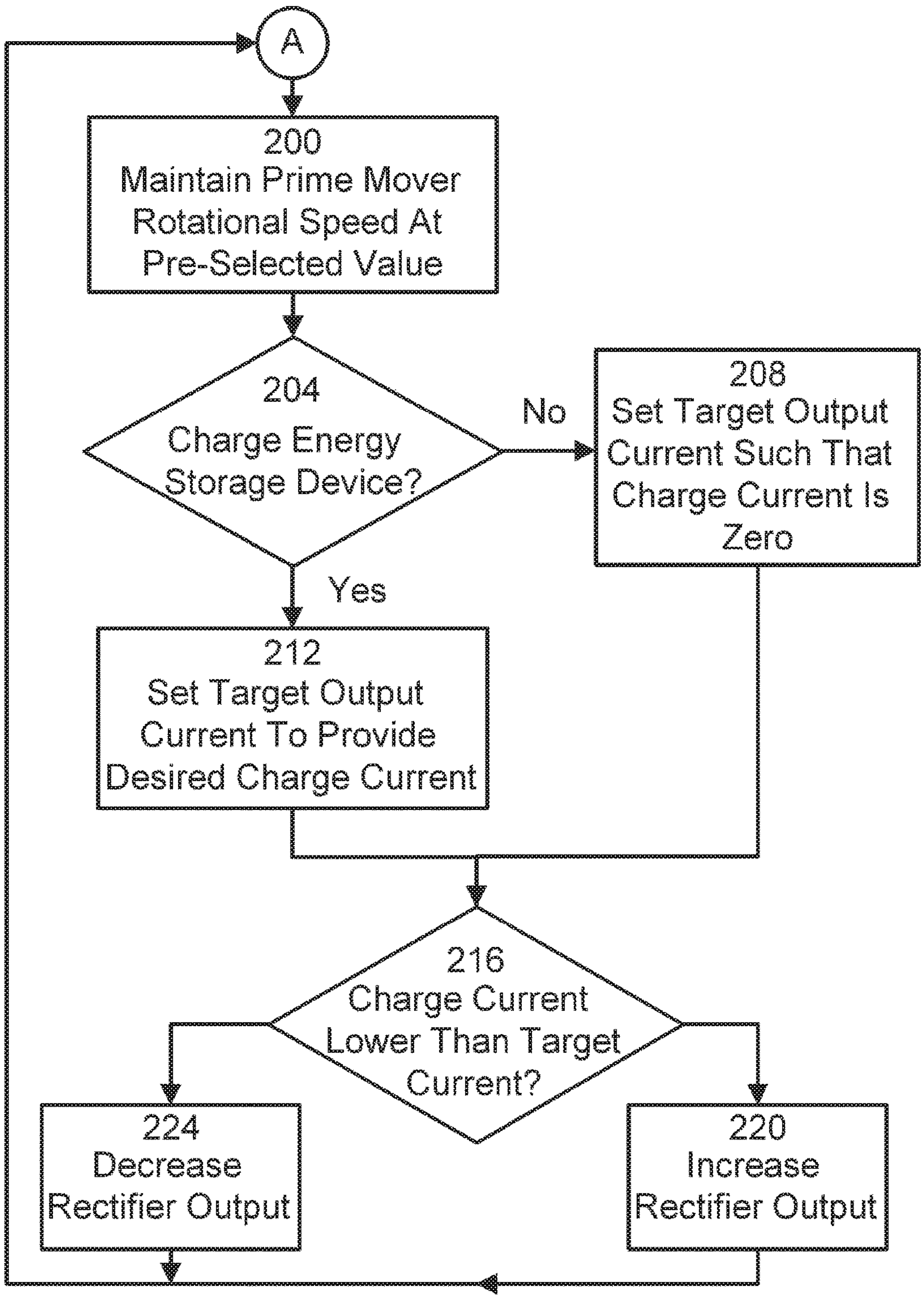
FIG. 3 is a flowchart showing a method of operating the powertrain of FIG. 1.

FIG. 3 shows the method of controlling normal operations of powertrain 20. In a current embodiment, after prime mover 24 has started operating engine controller 64 operates to maintain prime mover 24 rotating at a selected speed, as discussed above, irrespective of changes in the load applied to it by generator/motor 36. Thus, engine controller 64 monitors signal 68 from shaft rotational speed sensor 72 and varies throttle signal 76, ignition timing signal 80 and mixture signal 84 to maintain prime mover 24 operating at the selected speed, as closely as possible.

Accordingly, at step 200 of FIG. 3, engine controller 64 operates responsive to signal 68 to continuously adjust the operating parameters of prime mover 24 (throttle position signal 76, ignition timing signal 80 and mixture signal 84, etc) to keep its rotational speed substantially at the selected speed.

As should be apparent to those of skill in the art, as the power requirements of loads 60 change, the load on prime mover 24 will vary accordingly. Specifically, GCU 46 operates to control rectifier 44 to provide the necessary current to DC power bus 52 responsive to variations in loads 60 and GCU 46 modulates the PWM signals applied to rectifier 44 to provide the necessary current, thus changing the mechanical load on prime mover 24.

Energy storage device 56 provides needed energy to DC power bus 52 accommodate sudden changes in loads 60 while prime mover 24 and rectifier 44 are adjusted to compensate for those changes. Accordingly, GCU 46 monitors signal 88 to determine the current flow between energy storage device 56 and DC power bus 52 and uses this determination to increase or decrease the output DC current from rectifier 44 accordingly.

Specifically, at step 204 a determination is made as to whether energy storage device 56 should be charged. This determination can be made in a variety of ways, including monitoring the voltage level of energy storage device 56 and comparing it to a stored value, tracking and maintaining a record of energy flows into and out of energy storage device 56 to determine the net amount of energy stored therein and comparing that determined value to a pre-selected value, etc.

If, at step 204 it is determined that energy storage device 56 is sufficiently charged, then at step 208 the target charge current of powertrain 20 is selected such that the current flow between energy storage device 56 and DC power bus 52, as indicated by signal 88, will be substantially zero.

Conversely, if at step 204 it is determined that energy storage device 56 requires charging, then at step 212 a target charge current is selected. The selection of the target charge current can be achieved in a variety of manners as will be apparent to those of skill in the art. For example, depending upon the type of device used for energy storage device 56 (i.e.—battery, super capacitor, etc.) a constant value of charge current can be selected or a value can be selected from a lookup table associating charge levels, or voltage levels, with desired charging rates, etc.

At step 216 the selected target charge current is compared to the actual charge current indicated by signal 88 and, if it is determined that the actual charge current is lower than the target charge current, at step 220 the output of rectifier 44 is increased by GCU 46 modifying the duty cycle of the PWM signals in rectifier 44 to increase the actual charge current. Conversely, if at step 216 it is determined that the actual charge current is higher than the target charge current, then GCU 46 alters the PWM duty cycle in rectifier 44 to decrease the actual charge current.

After either step 220 or step 224, the process repeats, thus continuously checking and adjusting the current flow into or out of energy storage device 56. As will now be apparent, as energy storage device 56 is directly connected to DC power bus 52, the monitoring and control of the current flow into and out of energy storage device 56 effectively corresponds to, and controls, the power levels on DC power bus 52 and will be responsive to changes in electrical loads applied to DC power bus 52 by loads 60.

As will also now be apparent, energy storage device 56 functions to compensate for energy shortfalls, due to sudden increases in the total load applied to DC power bus 52 or decreases in the output of generator/motor 36 and/or rectifier 44, and/or to absorb sudden energy surpluses due to decreases in the total load applied to DC power bus 52 or increases in the output of generator/motor 36 and/or rectifier 44.

The amount by which the output of rectifier 44 is changed by GCU 46 at steps 220 and/or 224 is not particularly limited and can be a pre-selected fixed increment or can be varied according to a variety of parameters, including the magnitude of the difference between the target charge current and the actual charge current, the total energy stored in energy storage device 56, etc.

Thus, for example, if it is determined by appropriate means that energy storage device 56 is significantly discharged, the amount by which GCU 46 increases the output of rectifier 44 at step 220 can be a relatively large amount, compared to the amount by which the output of rectifier 44 would be increased by GCU 46 when energy storage device 56 is substantially fully charged but a load 60 on DC power bus 52 has only increased moderately.

In the case of increasing and/or decreasing by a fixed amount, the operating point of powertrain 20 can, in some cases, oscillate around the target charging current value, but provided that the method of steps 200 through 224 are repeated sufficiently quickly, a fixed increment value of an appropriate relatively small size can be selected to ensure that the magnitude of the oscillation is kept to an acceptable value. The selection of an appropriate increment value and/or variation strategy is within the normal skill of the audience to which this specification is addressed.

In a presently preferred implementation of powertrain 20, energy storage device 56 is sized such that prime mover 24 can be stopped and electrical loads 60 powered solely by energy storage device 56 for a period of time, after which energy storage device 56 will still have enough energy to power generator/motor 36 as a motor to restart prime mover 24. In such a manner, the device/system in which powertrain 20 is employed can offer a time limited "electric only" mode wherein the noise and/or vibration of prime mover 24 can be avoided. It is contemplated that for devices/systems such as UAV's filming sporting events, etc., such an electric only mode may be advantageous.

Accordingly, the capacity of energy storage device 56 can be sized accordingly with the complementary tradeoffs between energy storage capacity and the overall weight of powertrain 20 in mind. As will be apparent, if "electric only" mode is not required by the system/device in which powertrain 20 is installed, then the energy storage capacity of energy storage device 56 can be selected to be quite small and will be largely constrained only by the need to power generator/motor 36 for startup of prime mover 24 and to accommodate the largest expected rapid change of electrical loads 60 on DC power bus 52. In such a case, the overall weight of powertrain 20 will be less than would be the case if energy storage device 56 had a larger energy storage capacity which might be required to provide an electric only mode.

Figure 4:
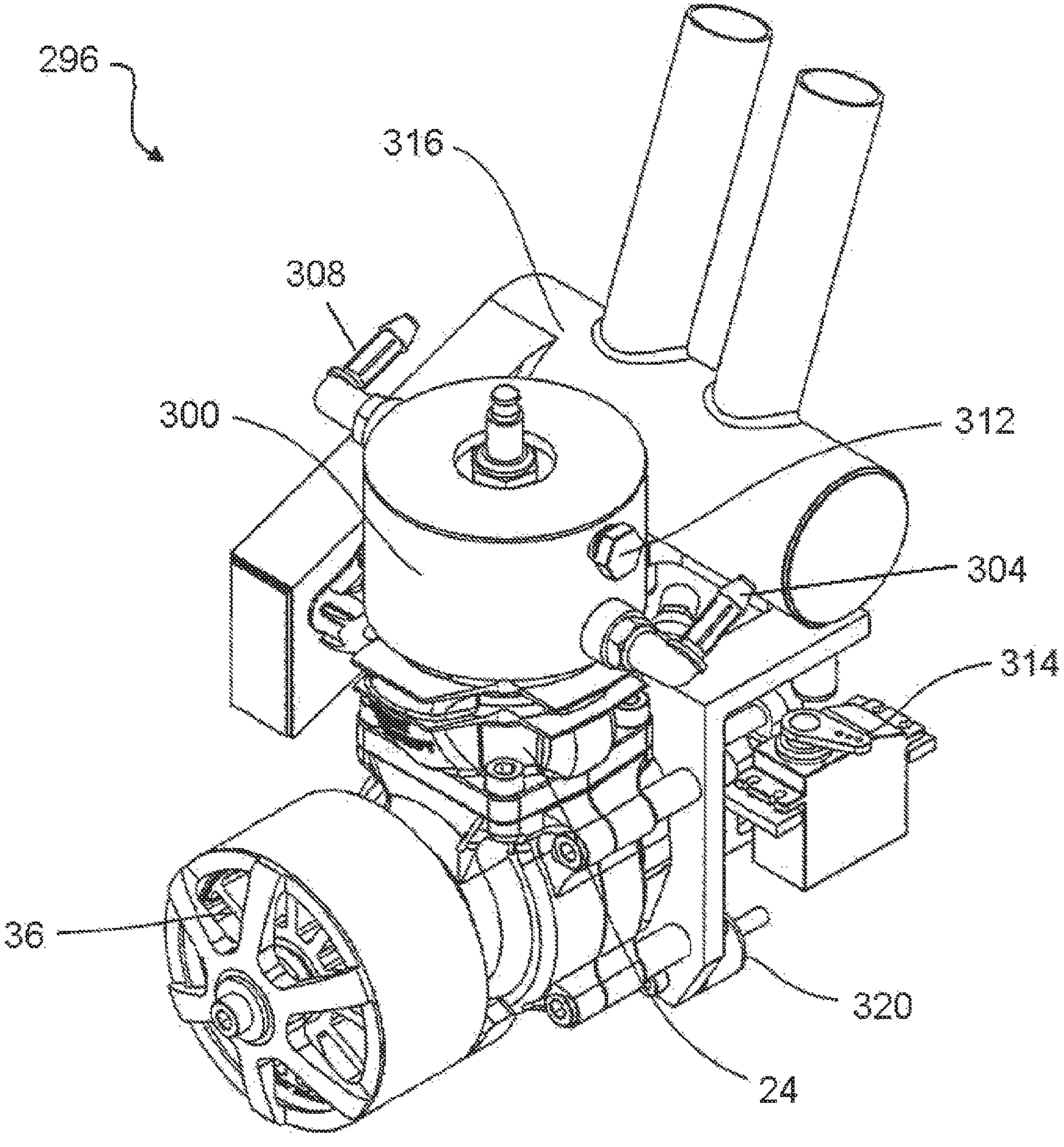
FIG. 4 is a perspective view of an assembly of a prime mover and generator/motor of the powertrain of FIG. 1.

FIG. 4 shows a current example of an implementation of an assembly 296 of prime mover 24 and generator/motor 36 of powertrain 20 wherein prime mover 24 is a single cylinder two stroke gasoline powered engine having a displacement of about 35cc. In the illustrated example, prime mover 24 is water cooled, via a water jacket 300 surrounding the cylinder of prime mover 24, and which has an inlet 304 and an outlet 308 that are correspondingly connected to an air to water heat exchanger (not shown). Water jacket 300 preferably further includes a temperature sensor 312 which provides engine controller 64 with a signal representing the temperature of the coolant within water jacket 300 (and thus the operating temperature of prime mover 24), allowing engine controller 64 to alter the operating parameters of prime mover 24 appropriately. The fuel/air mixture is provided to prime mover 24 via a high pressure fuel injector, not shown, with the fuel coming from reservoir 28 (not shown in this Figure) and a servo motor 314 is used to control the throttle position.

The exhaust gases of prime mover 24 are preferably expelled through a tuned exhaust 316 to improve the power production characteristics of prime mover 24, by tuning the engine port characteristics, and to reduce the operating noise of prime mover 24. It will be understood that, while exhaust 316 can reduce the operating noise of prime mover 24, typically the provision of such noise reduction characteristics, in addition to the port tuning provided by exhaust 316, can result in a reduction of in the overall output power of prime mover 24 and will increase the overall weight of powertrain 20. Thus, in some use cases where operating noise is not a major consideration, it may be desired to merely have exhaust 316 designed to provide port tuning improvements.

As is also shown in the Figure, the output crankshaft of prime mover 24 is coupled to generator/motor 36 and assembly 296 can be mounted to the device and/or system to be supplied with electrical power via a suitable set of vibration damping mounts 320.

Figure 5A:
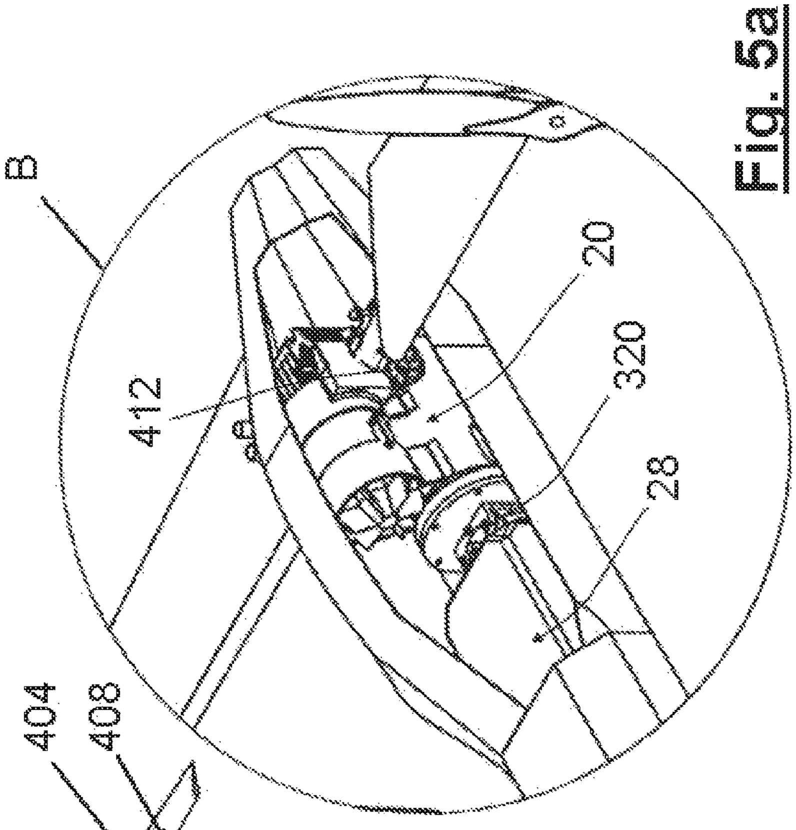
FIG. 5*a* is an enlarged view of the inset portion labeled "B" in FIG. 5.
Figure 5:
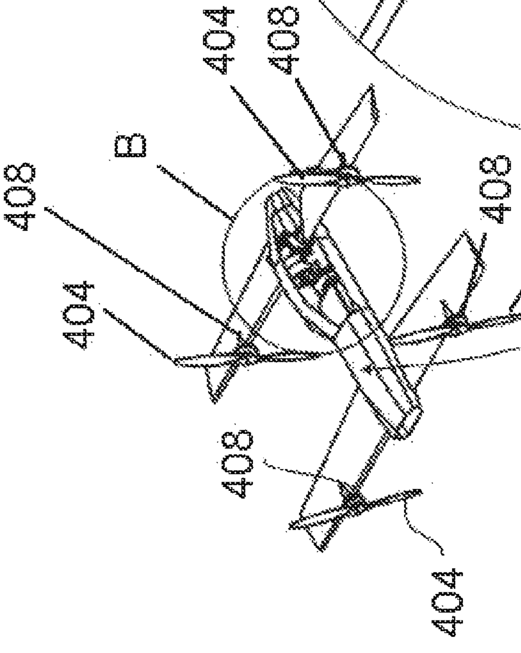
FIG. 5 is a perspective view of a UAV with the powertrain of FIG. 1 installed therein.

FIGS. 5 and 5*a* show an example of powertrain 20 installed in a tilt-wing drone or UAV 400. UAV 400 includes for rotor/propellers 404, each of which can be individually driven by a corresponding electrical motor 408 and also includes an electric motor 412 to provide the tilt wing capabilities of UAV 400. Each of motors 408 and motors 412 correspond to electrical loads 60 connected to DC power bus 52 of powertrain 20, and other loads, not shown, such as sensors, radios, cameras, etc. can also be connected as loads 60. As will be apparent, tilt motor 412 represents an electrical load which can be applied to, and removed from, DC power bus 52 in normal operation, resulting in relatively slow changes in the total load on DC power bus 52 while motors 408 represent electrical loads 60 on DC power bus 52 which are expected to vary relatively quickly and other loads, such as cameras and/or radios may require constant amounts of power. The design of powertrain 20 is configured, as described above, to accommodate all of these changes in electrical load.

While in the discussions above, prime mover 24 has been described as being fuel injected, the present invention is not so limited and it is contemplated that prime mover 24 can instead employ a carburetor (not shown) to supply the fuel-air mixture to prime mover 24. In such a case, it is contemplated that a mechanical (centrifugal) automatic constant speed throttle can be employed to maintain prime mover 24 at a desired operating speed or, more preferably, a control device, such as servo motor 314, can operate a throttle under the control of engine control unit 64.

The present invention is not limited to use with UAVs or similar devices and, instead, it is contemplated that powertrain 20 can be employed in a wide variety of use cases. For example, when employed in automotive applications, powertrain 20 can allow vehicles to be manufactured with a reduced reliance on batteries. As batteries are typically expensive and heavy components in current hybrid and electric vehicles, powertrain 20 can allow for vehicle powertrains to be manufactured at a significantly lower cost and weight while significantly improving fuel economy and serviceability.

Specifically, employing powertrain 20 in automotive and other vehicles reduces the reliance on batteries in these applications by reducing the power that the batteries need to supply in steady state operation, and reduces the battery energy storage needs for the vehicle. Consequently, the number and capacity of batteries can be reduced. Perhaps more significantly, the chemistry of required batteries can be changed, to increase operating lifetime, reduce costs, improve safety, etc. due to the increased flexibility of the proposed powertrain.

As described above, powertrain 20 provides advantages over conventional systems. One example advantage is the intended ability to store more energy in lighter, and smaller, form due to the relatively high gravimetric power density of combustion fuels, while greatly extending range and endurance of the vehicle.

Another example advantage of powertrain 20 is the ability to provide DC power at any of a wide range of desired voltages, independent of the rotational speed (RPM) of prime mover 24, provided only that the output voltage of rectifier 44 cannot be lower than the back EMF of generator/motor 36. In particular, due to the method by which powertrain 20 operates, it is possible to run prime mover 24 at a constant rotational speed. This allows for improved engine implementation and efficiencies as prime mover 24 can be selected, designed and/or tuned to operate very efficiently at the selected RPM. Regardless of the RPM that is selected, rectifier 24 can be configured to output the desired voltage. If desired, prime mover 24 can instead be operated at various speeds in order to improve fuel economy for given and/or varying operating conditions.

Another perceived advantage of powertrain 20 is the ability to employ anti-vibration mounts and related technologies as prime mover 24 is mechanically decoupled from the vehicle structure. Unlike typical powertrains that incorporate fuel engines directly providing output torque to vehicle propulsion systems via drive shafts, transmissions and the like, there is no direct mechanical coupling between prime mover 24 and the remainder of a vehicle drive train. As a result, there is less, or no, requirement for a rigid support structure that reacts or counteracts loads applied into the vehicle chassis by a directly coupled engine and this allows for more sophisticated mechanical isolating configurations to be implemented, reducing the amount of vibrations transmitted to the chassis. This is particularly important for applications, such as UAV's, wherein overall weight of the vehicle is important. Further, cameras, sensors, inertial measurement units, and other components will be able to operate more effectively as a result of the reduced vibrations.

Another perceived advantage is the compartmentalization of vehicle subsystems, which makes it easier to maintain and/or design vehicles. In particular, removing and replacing components is made easier because powertrain 20 is not mechanically coupled to the remainder of the vehicle. Maintenance may be performed faster and more efficiently as a result of being able to quickly access and manipulate components. In addition, parties interested in using powertrain 20 can take advantage of the flexibility of a system that does not require extensive mechanical powertrain integration.

Although the above examples are principally described in the context of small and medium sized vehicles, such as unmanned vehicles, powertrain 20 can also be applied to larger vehicles (e.g. cars, trucks, freight carriers, trains, etc.). The powertrain described herein may also be used in small portable electric generators.

It will be appreciated that the features of powertrain 20, and the application of powertrain 20 in a vehicle, are described herein with respect to example embodiments. However, these features may be combined with different features and embodiments of the powertrain or the vehicle, or both, although not explicitly stated.

The above-described embodiments of the invention are intended to be examples of the present invention and alterations and modifications may be effected thereto, by those of skill in the art, without departing from the scope of the invention which is defined solely by the claims appended hereto.

We claim:

1. A method of operating a hybrid powertrain including a prime mover which combusts a fuel, and an engine control unit operable to control the prime mover, a generator/motor connected to the prime mover, an active rectifier electrically connected between the generator/motor and a direct current power bus, a generator control unit operable to control the active rectifier and an energy storage device connected to the direct current power bus, comprising the steps of:

(i) receiving a signal to start the powertrain;

(ii) the generator control unit configuring the active rectifier to invert direct current power supplied to the power bus by the energy storage device into alternating current power;

(iii) providing the alternating current power to the generator/motor to rotate the prime mover;

(iv) the engine control unit starting the prime mover and the prime mover operating the generator/motor;

(v) the generator control unit configuring the active rectifier to rectify the alternating current produced by the rotation of the generator/motor to a direct current at a selected voltage, the selected voltage being independent of the operating speed of the prime mover, and providing that direct current to the direct current power bus; and (vi) the generator control unit monitoring the current flow between the energy storage device and direct current power bus and adjusting the operation of the active rectifier to alter the voltage of the rectified direct current provided to the direct current power bus such that the monitored current flow is substantially equal to a preselected value.

2. The method of operating a hybrid powertrain according to claim 1 further comprising the steps of:

(a) upon receipt of a first command, stopping operation of the prime mover;

(b) transferring power from the energy storage device to the direct current power bus to power an electrical load attached thereto;

(c) upon receipt of a second command, configuring the rectifier to invert power from the direct current power bus into alternating current power and supplying that alternating current power to the generator/motor to rotate the prime mover;

(d) restarting the prime mover; and (e) configuring the rectifier to convert the alternating current produced by the generator/motor into direct current power provided to the direct current power bus.

3. The method of operating a hybrid powertrain according to claim 1 wherein the operating speed of the prime mover is selected by the engine control unit to improve fuel efficiency of the prime mover.

4. The method of operating a hybrid powertrain according to claim 3 wherein the selected operating speed is determined algorithmically by the engine control unit to improve fuel efficiency of the prime mover.

* * * * *